US011998505B2

(12) United States Patent
Alperin et al.

(10) Patent No.: US 11,998,505 B2
(45) Date of Patent: Jun. 4, 2024

(54) ANTI-TIPPING APPARATUS FOR WALKERS

(71) Applicants: Avery Jordan Alperin, Newton, MA (US); Vivian Nina Lorusso, Walpole, MA (US)

(72) Inventors: Avery Jordan Alperin, Newton, MA (US); Vivian Nina Lorusso, Walpole, MA (US)

( * ) Notice: Subject to any disclaimer, the term of this patent is extended or adjusted under 35 U.S.C. 154(b) by 852 days.

(21) Appl. No.: 16/988,872

(22) Filed: Aug. 10, 2020

(65) Prior Publication Data

US 2022/0040029 A1 Feb. 10, 2022

(51) Int. Cl.
*A61H 3/00* (2006.01)

(52) U.S. Cl.
CPC ....... *A61H 3/00* (2013.01); *A61H 2201/0184* (2013.01); *A61H 2201/5053* (2013.01); *A61H 2201/5056* (2013.01); *A61H 2201/5069* (2013.01); *A61H 2201/5084* (2013.01)

(58) Field of Classification Search
CPC ........................................................ A61H 3/00
See application file for complete search history.

(56) References Cited

U.S. PATENT DOCUMENTS

| | | | | | |
|---|---|---|---|---|---|
| 3,165,112 | A * | 1/1965 | Ries | A61H 3/00 | D3/9 |
| 4,251,105 | A * | 2/1981 | Barker | A61H 3/04 | 482/67 |
| 5,477,211 | A * | 12/1995 | Reynolds | A61H 3/00 | 135/65 |
| 6,163,249 | A * | 12/2000 | Betcher, III | A61G 5/10 | 379/38 |
| 6,688,437 | B2 * | 2/2004 | Usherovich | A61G 5/1054 | 188/69 |
| 7,779,850 | B2 | 8/2010 | Caldwell | | |
| 8,936,033 | B2 * | 1/2015 | Velarde | A61H 3/04 | 135/84 |
| 10,322,054 | B2 * | 6/2019 | McGrath | G08B 21/0461 | |
| 2008/0072942 | A1 * | 3/2008 | Warren | G08B 21/0461 | 135/66 |
| 2019/0142683 | A1 * | 5/2019 | Kazerooni | B25J 9/0006 | 601/5 |

FOREIGN PATENT DOCUMENTS

WO WO-2008/036782 3/2008

OTHER PUBLICATIONS

Foley et al., "Improved Walker Design," report submitted to Worchester Polytechnic Institute, Apr. 9, 2010. 200 pages.

* cited by examiner

*Primary Examiner* — Noah Chandler Hawk
(74) *Attorney, Agent, or Firm* — Wilmer Cutler Pickering Hale and Dorr LLP

(57) ABSTRACT

Systems and methods are disclosed for preventing tipping of a walking aid including a sensor configured to detect an angle of tilt in a forward direction of a walking aid, an actuator configured to determine whether the angle of tilt crosses a pre-set threshold, and a retractable support that prevents tipping of the walking aid, wherein the actuator causes the retractable support to extend from the walking aid in the forward direction to limit the tilt of the walking aid when the actuator determines that the angle of tilt crosses the pre-set threshold.

22 Claims, 5 Drawing Sheets

ANTI-TIPPING APPARATUS FOR WALKERS

TECHNICAL FIELD

The present disclosure relates to walking aids, and more particularly to apparatuses and methods of preventing a walker from tipping over.

BACKGROUND

Walking aids, such as walkers, canes, etc., provide retractable support to people with limited mobility (e.g., the elderly or individuals who suffered an injury) to maintain balance or stability while walking. However, some research suggests that the use of walking aids can greatly increase the likelihood of falls and subsequent hospitalization. See Stevens J. A., et. al. J. Am. Geriatrics Society, 2009; 57(8):1464-9. While walkers and canes can aid individuals with mobility issues, they can also exacerbate risk of falls and injuries during loss of balance potentially due to improper gait.

There are existing devices designed to prevent a lateral tipping of a walking aid by limiting a lateral motion of the walking aid. However, it is noted that forward tipping of a walking aid can pose even a greater risk to a user, and potentially cause severe injury. Therefore, there is a need for an apparatus and a method of improving the stability of a walking aid and preventing it from tipping over in the direction a user is walking (i.e., forward tipping).

SUMMARY

In one aspect, the invention provides for an apparatus having a sensing module configured to detect an angle of tilt in a forward direction of a walking aid, an actuator configured to determine whether the angle of tilt crosses a pre-set threshold, and a retractable support that prevents tipping of the walking aid, wherein the actuator causes the retractable support to extend from the walking aid in the forward direction to limit the tilt of the walking aid when the actuator determines that the angle of tilt crosses the pre-set threshold.

In some embodiments, the forward direction is measured in a horizontal plane along an axis, aligned with the direction that a user of the walking aid is walking. In some embodiments, the sensing module includes an electronic sensor. In some embodiments, the electronic sensor includes at least one of an accelerometer, a tilt sensor, or a gyroscope. In some embodiments, the pre-set threshold is 80 degrees relative to a horizontal plane. In some embodiments, the actuator includes at least one of a mechanical actuator, a pneumatic actuator, or an electronic actuator. In some embodiments, the retractable support includes at least two legs.

In some embodiments, the apparatus further includes a retractor configured to retract the retractable support. In some embodiments the at least two legs are rotatably coupled to a frame of the walking aid to permit the at least two legs to pivot with respect to the frame of the walking aid.

In some embodiments, the apparatus includes an alarm component that is configured to indicate that an individual using the walking aid requires assistance. In some embodiments, the alarm produces at least one of an auditory or visual signal. In some embodiments, the walking aid is a walker or cane.

In another aspect, the invention provides for a method of preventing tipping of a walking aid including detecting an angle of tilt of the walking aid in a forward direction, determining whether the angle of tilt crosses a pre-set threshold, and extending a retractable support in the forward direction to prevent a walking aid from tipping when the angle of tilt crosses the pre-set threshold.

In some embodiments, the forward direction is measured in a horizontal plane along an axis, aligned with the direction that a user of the walking aid is walking. In some embodiments, the pre-set threshold is 80 degrees relative to a horizontal plane. In some embodiments, the retractable support includes at least two legs. In some embodiments, automatically extending a retractable support includes causing the at least two legs to pivot with respect to a frame of the walking aid. In some embodiments, a user of the walking aid is prevented from falling while using the walking aid when the retractable supports is released. In some embodiments, the method further includes retracting the retractable support after the retractable support is released. In some embodiments, the method includes indicating that an individual using the walking aid requires assistance. In some embodiments, the indication is in the form of at least one of an auditory or visual signal. In some embodiments, the walking aid is a walker or cane.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

For a more complete understanding of various embodiments of the disclosed subject matter, reference is now made to the following descriptions taken in connection with the accompanying drawings, in which.

DETAILED DESCRIPTION

Walking aids (e.g., walkers, rollators, canes, crutches, etc.) have proven to be great tools for people with limited mobility to gain additional support to maintain balance or stability while walking. However, a U.S. Centers for Disease Control and Prevention study found that from 2001 to 2006, an average of 129 Americans ages 65 and older were treated in emergency departments each day—a total of more than 47,000 each year—for injuries from falls that involved walkers and canes. See Stevens J. A., et. al. Journal of the American Geriatrics Society, 2009; 57(8):1464-9. Other studies have suggested that using a walking aid can increase a user's likelihood of falling, likely due to altered gait. See Roman de Mettelinge, T., et. al., J. Geriatric Physical Therapy, 2015; 38(3):127-32. It has been found as disclosed herein that tipping of a walking aid above a certain angle causes an individual to lose balance. In particular, tipping in the direction a user is walking (i.e., forward tipping) can pose a great risk of injury to the user. For example, individuals tend to look down when they walk which could cause an increased tendency to fall forward in the direction of walking.

Figure 1:
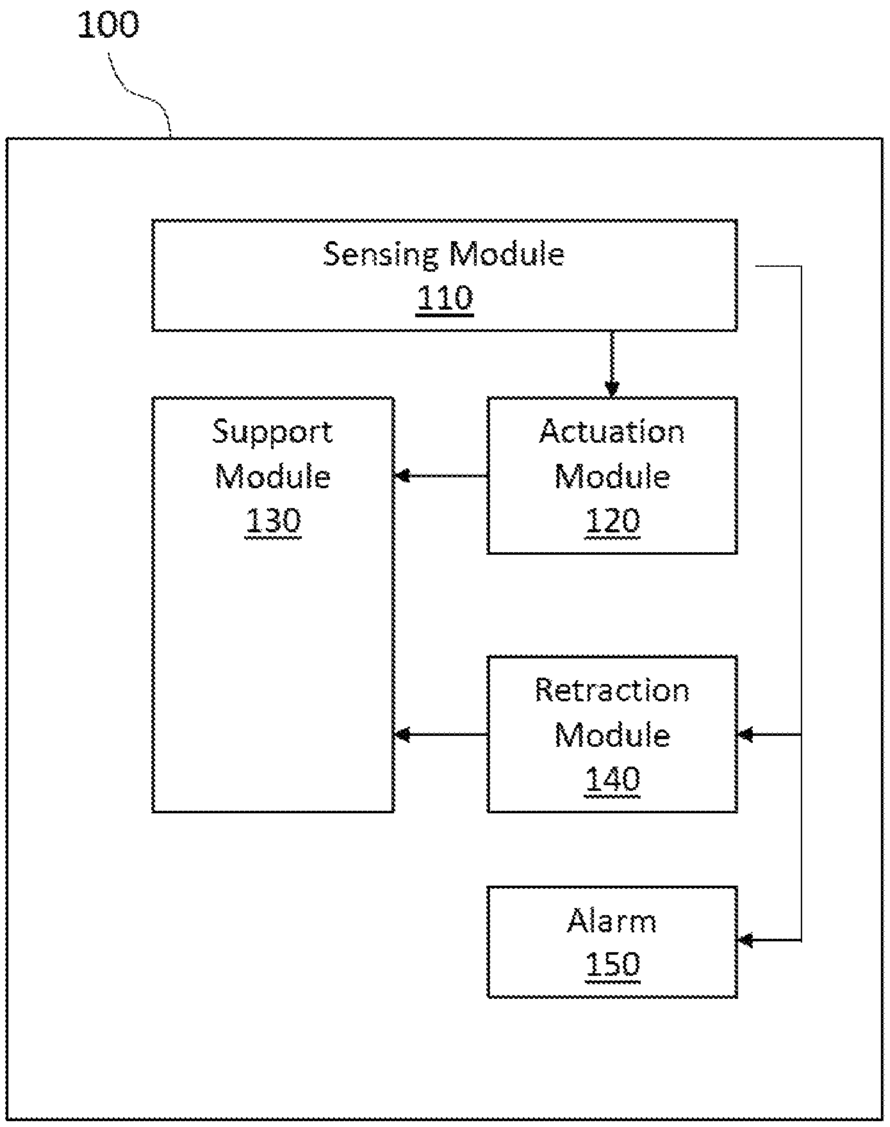
FIG. 1 is an illustrating diagram showing a configuration of an exemplary apparatus, according to some embodiments of the present disclosure.

The present disclosure describes apparatuses and methods of preventing a walker from forward tipping. FIG. 1 is an illustrating diagram showing a configuration of an exemplary apparatus 100, according to some embodiments of the present disclosure. The apparatus 100 can include a sensing module 110, an actuator 120, retractable supports 130, and a retractor 140. Sensing module 110 can include mechanical components and/or electronic sensors that respond to a user's movements while using a walking aid. Actuator 120 can include a mechanical actuator, such as a spring mechanism, which is engaged by a predetermined threshold detected by sensing module 110. Retractable supports 130 can include mechanical components such as retractable support legs which are deployed by actuator 120. Retractor 140 can include mechanical components and/or electronic sensors that engage to cause retraction of retractable supports 130. In some embodiments, the apparatus 100 can include other modules and/or components.

The sensing module 110 can monitor a motion status of a walker. In some embodiments, the sensing module 110 includes a mechanical coupling between the walker and a user. The mechanical coupling can be rigid (e.g., a mechanical linkage connected to the user's body) or flexible (e.g., a cord or rope worn by the user). If the user loses control of the walker (e.g., the walker is about to tip over), the sensing module 110 will be triggered due to the constraint imposed by the mechanical coupling between the user and the walker. In some embodiments, one end of a rope is worn by the user around the user's wrist and the other end of the rope can be connected to a trigger of the sensing module 110. Preferably, a rope is worn around each wrist, each rope being connected to a trigger of the sensing module 110.

In some embodiments, the sensing module 110 includes one or more electronic sensors. For example, the sensing module 110 can include a tilt sensor which can determine a tilt angle of the walker indicating if the walker is about to tip over. In some embodiments, the tilt angle is defined as the angle between the horizontal plane and a longitudinal axis of a leg of the walker. In some embodiments, the one or more electronic sensors include an accelerometer (e.g., a microelectromechanical system (MEMS) based accelerometer). In some embodiments, the accelerometer is a three-axis accelerometer which can sense accelerations in x, y, and z axes. By comparing the readings from the accelerometer with a known gravitational acceleration, the sensing module 110 can determine the tilt angle of the walker. In some embodiments, the sensing module 110 compares the tilt angle of the walker with a pre-set threshold value. If the tilt angle is less than the pre-set threshold value, it may be determined that the walker is about to tip over and the sensing module 110 can send a trigger signal to the actuator 120. In some embodiments, the pre-set threshold value is about 80 degrees, wherein 90 degrees signifies the walker in its upright balanced position and 0 degrees signified the walker lying horizontally on the horizontal plane. In some embodiments, the tilt sensor is configured to detect a tilt angle in only one plane. In order to detect whether the walker is tilting forward, the tilt sensor can be configured to detect a tilt angle in a y-z plane (e.g., x axis rotations), where the x axis is the direction that is perpendicular to the walking direction of the user, the y axis is the walking direction, and the z axis is the vertical direction (See FIG. 3A). In some embodiments, the tilt sensor is configured to detect tilt angles in more than one plane (e.g., a tilt angle crossing a threshold in any plane triggers the actuator).

In some embodiments, the one or more electronic sensors include a gyroscope (e.g., a MEMS-based gyroscope). In some embodiments, the gyroscope is a three-axis gyroscope which can sense angular velocity (rate of rotation) about x, y, and z axes. In some embodiments, the sensing module 110 compares the measured rates of rotation with one or more pre-set threshold values. If the rate of rotation about one axis, such as the horizontal x axis, is less than a pre-set threshold value, it may be determined that the walker is about to tip over and the sensing module 110 can send a trigger signal to the actuator 120. In some embodiments, the sensing module 110 integrates the rate of rotation over time to obtain a tilt angle and compares the obtained tilt angle with a pre-set threshold value. If the tilt angle is less than the pre-set threshold value within or across a predetermined time period, it may be determined that the walker is about to tip over and the sensing module 110 can send a trigger signal to the actuator 120.

The actuator 120 can receive a trigger signal from the sensing module 110 and cause a movement of the retractable supports 130. In some embodiments, the actuator 120 includes a mechanical actuator such as a spring mechanism. The spring can be in a depressed state when not triggered. Once a trigger signal is received, the spring can be released and the stored energy can be converted into a mechanical movement of a component (e.g., a pin) coupled to the spring. For example, the actuator 120 can include a spring-loaded latch.

In some embodiments, the actuator 120 includes a pneumatic actuator that converts energy formed by vacuum or compressed air at high pressure into a motion of a component.

In some embodiments, the actuator 120 includes an electric actuator which converts electric energy from a power source into a motion of a component.

The retractable supports 130 can include one or more retractable elements which can be deployed forward to provide retractable support to the walker (e.g., moved into a pre-set position in the direction the user is walking) by the actuator 120. The retractable supports 130 can be mechanically coupled with the actuator 120. In some embodiments, the retractable supports include one or more legs that can provide additional retractable support to the walker when deployed into a pre-set position. In some embodiments, the one or more legs can be made of wooden material. In some embodiments, the one or more legs can be made of metal (e.g., steel, aluminum, alloy, etc.). In some embodiments, the one or more legs can be made of polymer (e.g., plastic). In some embodiments, the one or more legs can be made of a composite material. In some embodiments, the composite material includes carbon fibers. In some embodiments, the legs are detachable from the walking aid.

In some embodiments, the retractable supports 130 may be of various lengths and may be attached at different positions along the frame of the walking aid. For example, retractable support elements that are about 70% of the height of the frame of a walking aid may be attached at about 70% along the height of the frame of the walking aid (relative to the ground) to catch the walking aid at a specific angle when deployed. The length of retractable supports 130 and the height of their attachment along the frame of a walking aid can be adjusted to create any desired angle of tilt of the walking aid during final deployment of the retractable supports 130 (see FIG. 3C for an example of a walker deployed at an approximately 45 degree angle using retractable support legs that are about 70% of the length of the walker and are attached at about 70% along the frame's height). In some embodiments, the resulting angle along the y-z direction of the walking aid during deployment of the retractable supports 130 is more than about 70 degrees, between about 70 degrees and 80 degrees, between about 60 degrees and 70 degrees, between about 50 degrees and 60 degrees, between about 40 and 50, or less than about 40 degrees.

In some embodiments, the apparatus 100 includes a retractor 140 which can retract the retractable supports 130 after a deployment. The retractor 140 can be mechanically coupled with the retractable supports 130. In some embodiments, the retractor is a standalone component. In some embodiments, the retractor is embedded within the actuator 120.

In some embodiments, the retractor 140 includes a spring mechanism. In some embodiments, the retractor 140 includes a cord connected to the retractable supports 130. When the cord is pulled by the user, the retractable supports 130 can return to its default position. In some embodiments, the retractor 140 includes a pneumatic actuator or an electric actuator. For example, when the user presses a button, the retractor 140 can be activated to retrieve the retractable supports 130.

In some embodiments, the retractor is automatically engaged. For example, when the user regains balance and pulls the walker into its upright position, the sensing module 110 can detect a tilt angle that is substantially 90 degrees. Therefore, it can be determined that the retractable supports 130 does not need to be in a deployed state any longer. The retractor 140 can initiate a retraction process to return the retractable supports 130 in its default position. In some embodiments, the retractor is engaged by the user (e.g., by pressing a button) after partial or complete deployment of the retractable supports 130.

In some embodiments, the apparatus 100 includes an alarm 150. Sensing module 110 triggers alarm 150 when a tile angle below a pre-set threshold is detected. Alarm 150 may be a physical component located on any internal or external surface of the apparatus which produces an indication that an individual using the apparatus (e.g., walking aid) has fallen. Alarm 150 may for example include a display screen with flashing lights to indicate to passersby that an individual requires aid. In some embodiments, alarm 150 may produce an audible signal to indicate to passersby that an individual requires aid. In some embodiments, alarm 150 may be configured to notify first responders that an individual has fallen at a given location and requires attention. First responders may include a police station, paramedics, a nursing home where the user of the waking aid resides, or family members of the user of the walking aid. Alarm 150 may include GPS location tracking capabilities and may communicate location of the incident to first responders using any wireless communication method known in the art.

Figure 2:
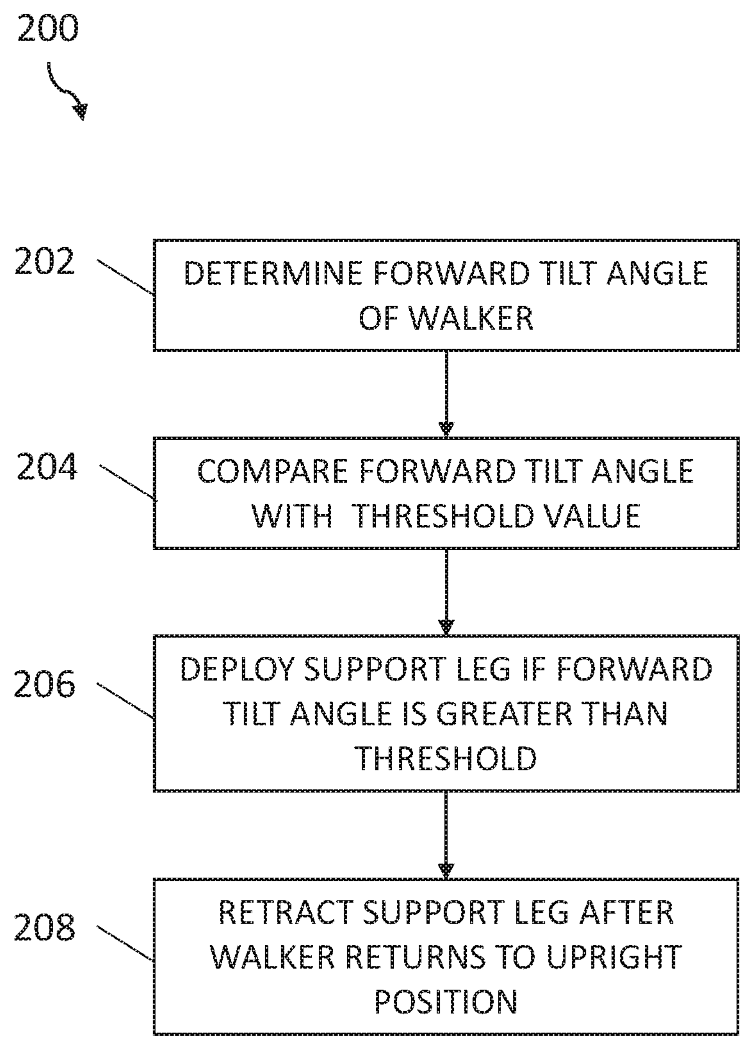
FIG. 2 is an illustrative flowchart showing an exemplary method of preventing a walker from tipping, according to some embodiments of the present disclosure.

FIG. 2 is an illustrative flowchart showing an exemplary method 200 of preventing a walker from tipping, according to some embodiments of the present disclosure.

In some embodiments, a walker can include a sensing module which monitors the motion status of the walker and detects a forward tilting of the walker. The sensing module can determine a forward tilt angle of the walker (step 202). In some embodiments, the tilt angle is defined as the angle between the horizontal plane and a longitudinal axis of a leg of the walker (or the main shaft of a cane or crutches). In some embodiments, the sensing module includes a tilt sensor which can determine a tilt angle of the walker indicating if the walker is about to tip over. In some embodiments, the one or more electronic sensors include an accelerometer (e.g., a micro-electromechanical system (MEMS) based accelerometer). In some embodiments, the accelerometer is a three-axis accelerometer which can sense accelerations in x, y, and z axes. By comparing the readings from the accelerometer with a known gravitational acceleration, the sensing module can determine the tilt angle of the walker.

The sensing module can compare the determined tilt angle with a pre-set threshold value (step 204). In some embodiments, the pre-set threshold value is determined by averaging over different data obtained from empirical studies. In some embodiments, the pre-set threshold value is determined based on walking behavior of a specific user (i.e., the current user of the walker). For example, in a controlled laboratory setting, the tilt angle of a walker can be determined by measuring the gait of the user and determining the angle of the walker that results when a user's gait is predictive of an imminent fall. In some embodiments, the user can be asked to tilt the walker forward and report when he or she cannot maintain balance any longer. The tilt angle corresponding to that walker's position can then be recorded as the threshold value. In some embodiments, other techniques can be used to determine the pre-set threshold.

If the sensing module determines that the tilt angle is less than the pre-set threshold value, it can trigger an actuator to deploy a retractable support which offers additional support to the walker and prevents it from tipping (step 206). For example, the actuator can deploy the retractable supports with a mechanical actuator (e.g., a spring-loaded latch), a pneumatic actuator, or an electric actuator. The deployment of the retractable supports can preferably prevent a user from falling. The sensing module can additionally trigger an alarm (see alarm 150 in FIG. 1) to notify others that an individual using a walking aid has fallen and requires assistance.

After the user regains balance and pulls back the walker to its upright position, the retractable supports can be retracted (step 208). For example, a retractor can return the retractable supports to its initial position and make it ready for the next deployment.

Figure 3A:
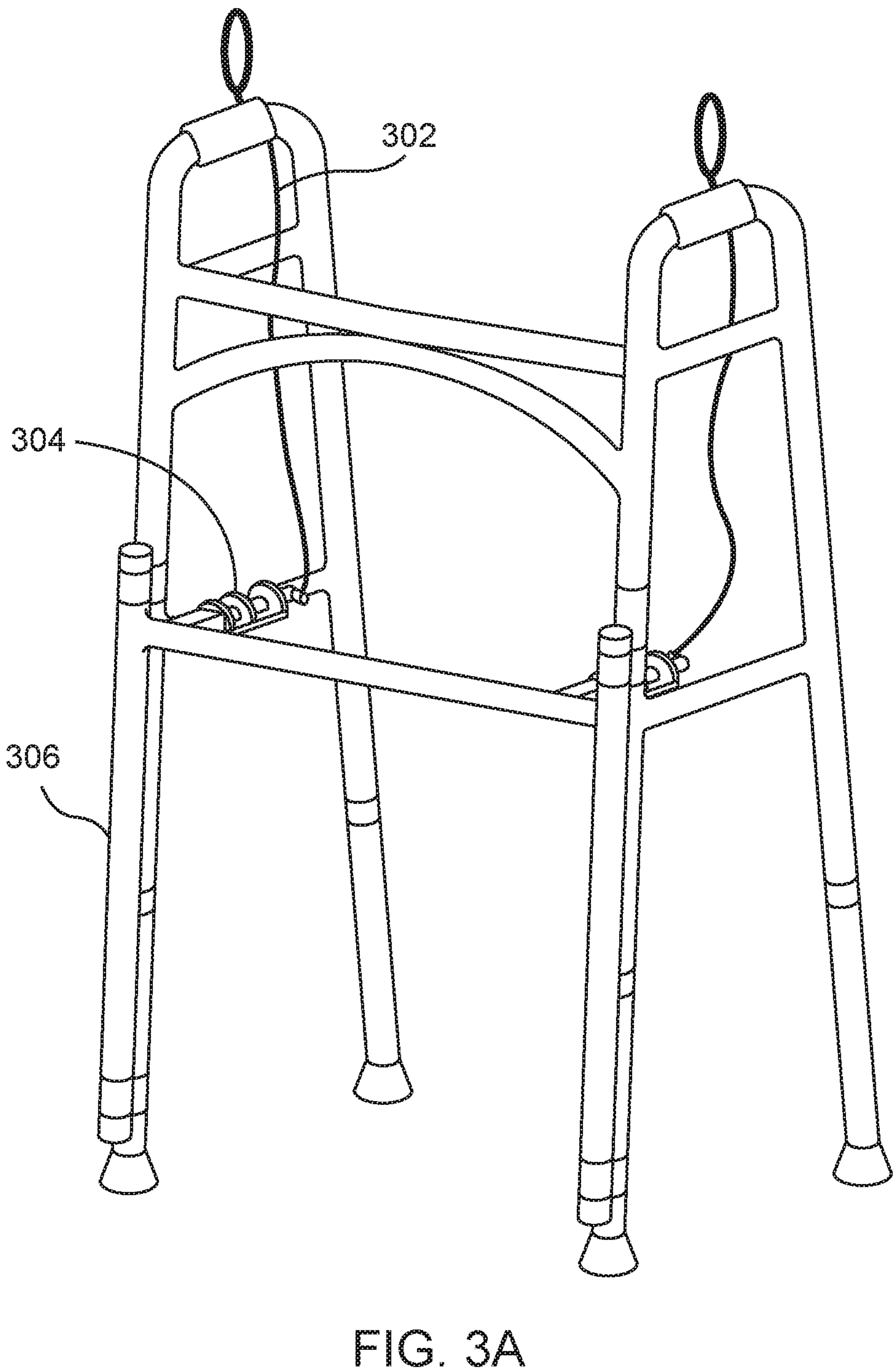
FIGS. 3A, 3B, and 3C illustrate an exemplary anti-tipping apparatus, according to some embodiments of the present disclosure.
Figure 3B:
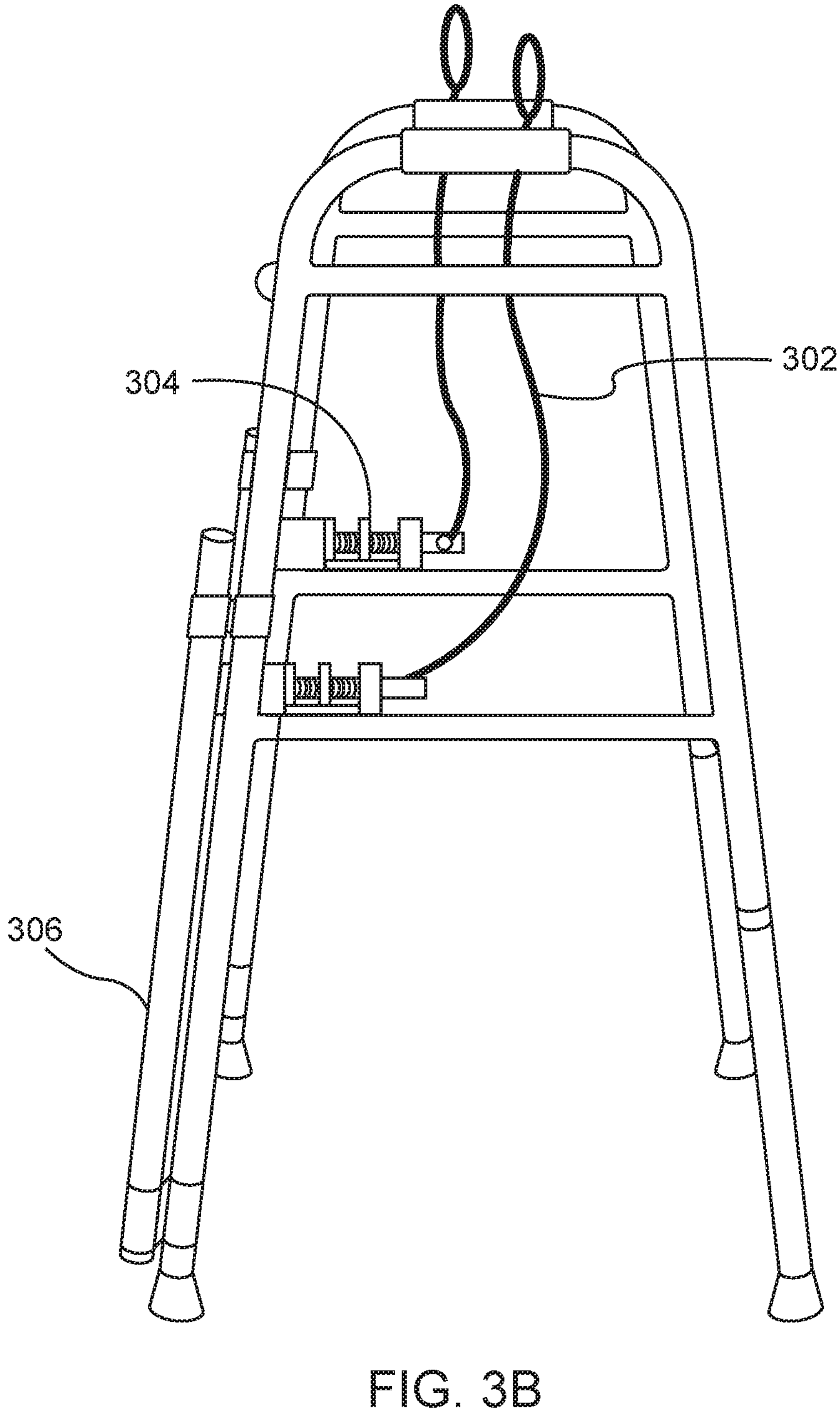
Figure 3C:
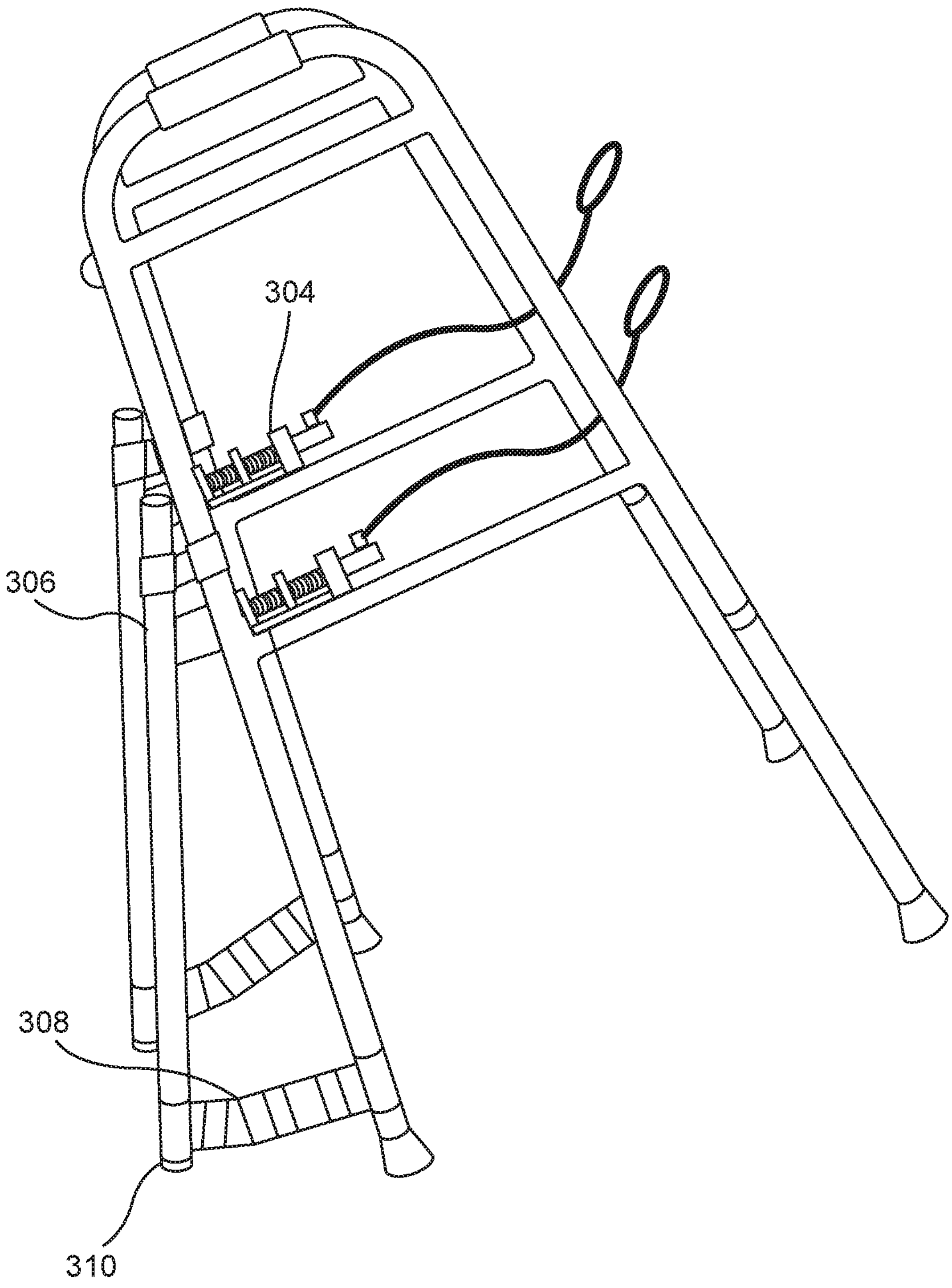

FIGS. 3A, 3B, and 3C show an exemplary anti-tipping apparatus 300, according to some embodiments of the present disclosure. FIGS. 3A and 3B show the exemplary apparatus 300 in an upright position, ready for walking use, with the retractable supports in a retracted or stowed state. FIG. 3C shows the exemplary apparatus 300 with the retractable supports deployed which catches the walker.

As shown in FIG. 3A, the apparatus 300 can include one or more ropes 302, one or more spring latches 304, and one or more retractable support legs 306. As shown in FIG. 3B, one end of the rope 302 can be worn by the user on his or her body (e.g., wrist) while using the walker. The other end of the rope 302 can be connected to the spring latch 304. The length of the rope 302 can be chosen such that the rope is in a relaxed state when the user is walking with the walker during balanced states. When the walker starts to tip over, the rope will be tensioned due to the increased distance between the user and the walker and therefore pull the spring-loaded latch to deploy the retractable support legs.

Alternatively, in some embodiments, the walker includes a tilt sensor. Thus, the user does not need to wear a rope in order to trigger a deployment of the retractable supports. This may provide convenience to the user and mitigate the risk of falling if the user forgets to wear the rope while using the walker. The tilt sensor can be activated by the user before walking by pressing a button and it will then start to continuously measure a forward tilt angle of the walker. Alternatively, the tilt sensor may be activated by the user's motion without the need for the user to press a button. Once the tilt sensor determines the measured forward tilt angle crosses a threshold value, it can trigger an actuator. As shown in the exemplary embodiment of FIGS. 3A, 3B, and 3C, the actuator can include a mechanical actuator such as the spring-loaded latch 304.

The spring-loaded latch can include a mount, a housing, a spring, and a pin. The mount can be fixed on a side frame of the walker by various means (e.g., screws, adhesive, etc.). The connection between the mount and the walker frame can be permanent or releasable. The housing provides mechanical retractable support for the spring and the pin. In some embodiments, the spring is depressed when the pin is in a retracted position. In an embodiment that uses a rope, the rope is connected at or near the end of the pin. When the rope is tensioned and exerts a torque on the pin to make it rotate, the spring is released, and the stored energy is converted into a linear motion of the pin. The pin is mechanically coupled to the retractable support leg. For example, when the pin moves forward, it exerts a force on the retractable support leg 306 to deploy the retractable support leg 306.

Referring again to FIG. 3A, the anti-tipping apparatus 300 can include more than one spring-loaded latch to provide enough force for deploying the retractable support leg 306. For example, there can be one or more (e.g., two, three, or more) spring-loaded latches for each retractable support leg and the spring-loaded latches can be triggered at the same time and work cooperatively to deploy the retractable support leg. The retractable support legs of the walker may be configured such that the pin exerts its force directly onto the retractable support legs to deploy them. In some embodiments, the tension of the rope causes release of the spring when the walker is tilted forward in the horizontal plane at about 80 degrees.

The retractable support leg 306 can be stowed against the frame of the walker, e.g., in the front or to the side, so that the retractable support leg 306 aligns substantially parallel with one of the frame legs of the walker. In this retracted state, the walker can maintain a weight distribution suitable for use during walking. Additionally, it can make the design of the walker more compact to save space during use and for storage purposes. It can also make the walker easy to carry when not used (e.g., store the walker in a trunk of a car). The top end of the retractable support leg 306 can be connected to the frame of the walker to form a pivot point about which the retractable support leg 306 can rotate.

The lower end of the retractable support leg 306 can be connected to the frame of the walker by a linkage mechanism (shown as 308 in FIG. 3C). For example, the linkage mechanism 308 can include two bars so that the retractable support leg can be in a locked position when deployed due to the constraint of a four-bar linkage formed by the retractable support leg, the walker frame, and the two linkage bars. The user may unlock the retractable support either manually by pushing on the linkage bars in the opposite direction from deployment to cause the linkage bars to fold thereby retracting the retractable support back to its ready position. In another embodiment, a button may be provided for the user to press to cause automatic retraction of the retractable support.

FIG. 3C shows the anti-tipping apparatus 300 in a deployed position. The bottom of the retractable support leg 306 can include a layer of material 310 which provides enough friction to prevent the retractable support leg 306 from sliding on the ground. In some embodiments, the material includes rubber, plastic, or other materials. In some embodiments, the surface of the linkage mechanism 310 is coated with a layer of material 310.

In an exemplary embodiment, a user begins walking with a walker which has retractable support legs in a retracted state. The user makes an error in gait and begins to tilt forward while holding onto the walker. The sensing module of the walker senses a tilt angle of the walker below a pre-set threshold value (e.g., 80 degrees). The sensing module triggers the actuator which causes immediate deployment of the retractable support legs. The walker's tilt motion is halted by the retractable support legs contacting a hard surface such as the ground. The user who is holding onto the walker is prevented from falling due to the rebalancing of the walker and halting of downward motion. The user repositions the walker back to its upright (90 degree) position, followed by pressing a button to cause retraction of the retractable support legs back to the fully retracted state. The user is ready to continue walking with the walker.

EXAMPLES

Example 1

Determining an Appropriate Tilt Angle Threshold for Walking Aid Retractable Support Leg Deployment A study was conducted with 3 healthy and mobile human subjects (of middle age) to determine a suitable tilt angle for triggering the deployment of the retractable support legs in a walker. Each subject was given a standard walker with 4 legs (without additional retractable support or sensor modules) and asked to tilt the walker slowly forward along the horizontal plane. The subjects were asked to cease continued tilt and hold the walker in its tilted position as soon as they reported subjective perception of loss of balance. A mobile application (Procreate®) was used to determine the tilt angle of the walker at the time of reported loss of balance. The tilt angle for each subject was recorded. The average tilt angle across subjects was 80 degrees, with 90 degrees representing the walker in its upright most position and 0 degrees representing the walker lying flat on a horizontal surface. The tilt angle of 80 degrees was subsequently used to create a prototype of a walker with retractable support legs that are deployed when the walker crosses the 80-degree tilt threshold. In some embodiments of the present invention, an individual tilt angle can be determined for each individual subject and the walker can be customized with a different tilt angle threshold for each user as previously described herein.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. An apparatus comprising:

a sensor configured to detect an angle of tilt in a forward direction of a walking aid;

an actuator configured to determine whether the angle of tilt crosses a pre-set threshold; and a retractable support configured to prevent a tipping of the walking aid, wherein the actuator causes the retractable support to extend from the walking aid in the forward direction to limit the angle of tilt of the walking aid when the actuator determines that the angle of tilt crosses the pre-set threshold.

2. The apparatus of claim 1, wherein the forward direction is measured in a horizontal plane along an axis aligned with a direction that a user of the walking aid is walking.

3. The apparatus of claim 1, wherein the sensor is an electronic sensor.

4. The apparatus of claim 3, wherein the electronic sensor comprises at least one of an accelerometer, a tilt sensor, or a gyroscope.

5. The apparatus of claim 1, wherein the pre-set threshold is 80 degrees relative to a horizontal plane.

6. The apparatus of claim 1, wherein the actuator comprises at least one of a mechanical actuator, a pneumatic actuator, or an electronic actuator.

7. The apparatus of claim 1, wherein the retractable support comprises at least two legs.

8. The apparatus of claim 7, wherein the at least two legs are rotatably coupled to a frame of the walking aid to permit the at least two legs to pivot with respect to the frame of the walking aid.

9. The apparatus of claim 1, further comprising a retractor configured to retract the retractable support.

10. The apparatus of claim 1, further comprising an alarm configured to indicate that a user of the walking aid requires assistance.

11. The apparatus of claim 10, wherein the alarm produces at least one of an auditory signal or a visual signal.

12. The apparatus of claim 1, wherein the walking aid is a walker or a cane.

13. A method configured to prevent a tipping of a walking aid, the method comprising:

detecting with a sensor an angle of tilt of the walking aid in a forward direction;

determining with an actuator whether the angle of tilt crosses a pre-set threshold; and automatically extending a retractable support in the forward direction upon determining that the angle of tilt crosses the pre-set threshold.

14. The method of claim 13, wherein the forward direction is measured in a horizontal plane along an axis aligned with a direction that a user of the walking aid is walking.

15. The method of claim 14, wherein the pre-set threshold is 80 degrees relative to the horizontal plane.

16. The method of claim 13, wherein the retractable support comprises at least two legs.

17. The method of claim 16, wherein automatically extending the retractable support comprises causing the at least two legs to pivot with respect to a frame of the walking aid.

18. The method of claim 17, wherein automatically extending the retractable support prevents a user of the walking aid from falling forward while using the walking aid.

19. The method of claim 18, further comprising retracting the retractable support after the retractable support is released.

20. The method of claim 13, further comprising indicating that a user of the walking aid requires assistance.

21. The method of claim 20, wherein indicating that the user of the walking aid requires assistance comprises producing at least one of an auditory signal or a visual signal.

22. The method of claim 13, wherein the walking aid is a walker or a cane.

* * * * *